United States Patent Office 3,666,474
Patented May 30, 1972

3,666,474
SOLVENT SOLUBLE DIAZONIUM METAL SALTS AND DIAZOTYPE MATERIAL THEREFOR
Ralph G. D. Moore, Chenango Forks, N.Y., assignor to GAF Corporation, New York, N.Y.
No Drawing. Filed Sept. 11, 1968, Ser. No. 759,195
Int. Cl. G03c 1/54, 113/04
U.S. Cl. 96—91
9 Claims

ABSTRACT OF THE DISCLOSURE

Light sensitive diazonium hexafluoroarsenate and hexafluoroantimonate salts which are employed in the preparation of diazo formulations for the sensitization of base materials.

The instant application is directed to light sensitive solvent soluble diazotype compounds. In particular, the instant application is directed to diazonium hexafluoroarsenate and diazonium hexafluoroantimonate compounds and their use in the preparation of diazo formulations which are suitable for the sensitization of base materials.

As is well known, the diazo process comprises the application of a light sensitive diazo-salt composition to a carrier or base which may be paper or transparent film, such as cellulose acetate or a plastic-coated base support. In the dry development or two-component process, the sensitizing composition comprises a diazo compound, a coupling component or color former, and an acidic coupling inhibitor. In diazo reproduction, the sensitized base is exposed to ultraviolet light, through a pattern having opaque image portions. The unmasked portions of the diazo are decomposed by the light. Development to obtain an azo dye image is accomplished by placing the exposed material in an alkaline atmosphere which neutralizes the acidic inhibitor, allowing the undecomposed diazo and coupler to react.

In sensitizing formulations, the diazos are usually in the form of stabilized compounds of acidic salts such as zinc chloride, cadmium chloride, stannic chloride, and boron trifluoride. These salts are used to stabilize the diazo and also to enhance the keeping quality or shelf life of the sensitized diazotype material. It is also the general practice to provide some means of inhibiting print discoloration and image fading. To achieve this end, various additives are generally used in diazo formulations, such as thiourea, thiourea derivatives and other similarly acting compounds. Zinc chloride is also generally used as an additive in diazo formulations to further improve the shelf life of the diazotype materials.

Notwithstanding the use of various stabilizers and additives in diazotype formulations, stability or shelf life characteristics of diazo type materials have not been entirely satisfactory, particularly in diazotype materials sensitized with formulations employing diazos noted for their high coupling activity and/or instability.

In the normal practice, light-sensitive stabilized complex salts of diazonium compounds such as tetrachlorozincates, tetrachlorocadmates or hexachlorostannates are coated onto a support material with an essentially aqueous solution. The solubilities of these conventional salts are usually adequate for such coatings. Films, however, are coated with non-aqueous solutions as distinguished from the aqueous solutions employed in connection with diazotype papers. Solvents employed in connection with films generally are a mixture of organic solvents such as alcohols and ketones. When such solvents are employed complex diazonium salts, such as those noted above, are usually much too insoluble for practical use.

In this connection it has long been know that diazonium tetrafluoroborates are more suitable for the coating of films inasmuch as the tetrafluoroborate complex is much more soluble in diazotype film coating formulations than are the metallic salt complexes previously noted. Therefore, diazonium tetrafluoroborates are in common usage throughout the industry even though they have numerous inherent disadvantages including low thermal stability and shorter shelf life.

In addition to diazonium tetrafluoroborates, diazonium hexafluorophosphates have also been described to be suitable for use in diazotype film formulations. The hexafluorophosphate complexes are said to have low water solubility and high organic solvent solubility which would make them particularly advantageous for this type use. Furthermore, the diazonium hexafluorophosphate compounds are also said to have extended shelf life in connection with the coated end product.

It is noted, however, that all of the above-noted compounds do still suffer from several inherent disadvantages including relatively short shelf lifes, background discoloration, under conditions of high temperature and high humidity, insufficient organic solvent solubility, etc.

Therefore, it is an object of the instant invention to provide novel diazotype sensitizers which overcome all of the above-noted disadvantages of presently known diazo sensitizers.

Another object of the instant invention is to provide novel diazotype formulations which are suitable for sensitizing base materials.

Yet, another object of the instant invention is to provide stable diazotype film base light sensitive products.

The above and other objects and advantages of the instant invention will be more readily apparent from the following more detailed description thereof.

It has now been found that certain diazo compounds, and in particular, diazonium hexafluoroarsenates and diazonium hexafluoroantimonates, are especially suited for use in light sensitive diazotype formulations. The new and novel salts which have been found to be useful in connection with the instant invention may be represented by the formula:

$$ArN_2ZF_6$$

wherein Ar represents a substituted aromatic radical such as a substituted phenyl; as for example, p-dialkylaminophenyl, 4-dialkylaminotolyl, 4-dialkylamino-2,5-dialkoxyphenyl, 4-arylthio-2,5-dialkoxyphenyl, 4-dialkylamino-x-halogenophenyl, p-morpholinophenyl, 4-(1-piperazinyl)phenyl, p-(1-pyrrolidinyl)phenyl, and 4-(1-pyrrolidinyl)-m-tolyl and the like.

Z represents a member selected from the class consisting of arsenic and antimony.

The novel diazonium hexafluoroarsenates and diazonium hexafluoroantimonates of the instant invention may generally be prepared by the treatment of an aqueous solution of a compound having the formula:

$$ArN_2X$$

with an aqueous solution of a compound having the formula:

$$MZF_6$$

wherein Ar and Z have the same meaning as noted above; X is an anion which forms a soluble salt with $ArN_2$ such as $Cl^-$, $SO_4^=$, $ZnCl_4^=$, $SnCl_6^=$, $CdCl_4^=$; M represents either hydrogen or a metal which as an acid or salt with $ZF_6$ is more soluble in water than the desired end product— $ArN_2ZF_6$ In particular, the metal or other cation may be metals such as potassium, sodium and cations such as ammonium. The particular salt employed is not critical; however, in general, the preparation of the novel diazonium hexafluoroarsenates and diazonium hexafluoroantimonates may be represented by the equation:

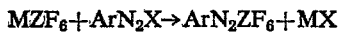

As may readily be seen, this equation represents a double decomposition reaction and as noted above, this reaction is preferably carried out in an aqueous medium.

One possible process for the preparation of the novel compounds of the instant invention is to first dissolve the diazo salt, $ArN_2X$, in the reaction medium. The hexafluoroarsenate or antimonate represented by the formula:

is then introduced into the solution. The solution may be stirred to accelerate the solution of the hexafluoroantimonate or arsenate salt. The amount of $MZF_6$ which is added to the salt is preferably slightly in excess of the stoichiometric amount required for the reaction with a diazo compound which is a 1:1 mole ratio.

The diazo cation $ArN_2+$ and the $ZF_6^-$ anion always combine in a 1:1 molar ratio and thus the exact composition of the reaction product $ArN_2ZF_6$ is precisely predictable and does not vary from reaction to reaction. This stoichiometry permits more exact control of the formulations used in sensitizing diazo type products. Precipitation of $ArN_2ZF_6$ illustrated by the above equation usually occurs without further treatment of the solution, although under certain conditions it may be desirable to initiate precipitation of the diazosalt by cooling or seeding the solution.

Because diazosalts are usually prepared by ionic reactions in aqueous media and are recovered by precipitation, the yield depends on the solubility product of the diazosalt in the reaction media. Consequently, diazosalts of lower solubility in water can be more economically recovered than those which are more soluble. Many otherwise valuable diazos have not attained commercial importance in the diazo type process because of the relative difficulty encountered in recovering or isolating the diazos as stabilized salts of zinc chloride, cadmium chloride, stannic chloride, boron trifluoride and like conventionally used stabilizing salts for diazos. It has been found that the $ZF_6$ radical imparts a property of lower water solubility to diazos with which it is combined in accordance with the equation give above. This facilitates the economical manufacture of a variety of stabilized diazosalts by double decomposition reaction in aqueous media.

In accordance with the invention disclosed herein, there are numerous diazonium salts which may be represented by the formula: $ArN_2X$ which may be employed in the production of the novel products of the instant invention. These compounds include, but are in no way limited to, 4-diethylamino-2-ethoxybenzenediazonium tetrachlorozincate
4-ethylamino-m-toluenediazonium tetrachlorozincate
p-dimethylaminobenzenediazonium tetrachlorozincate
p-diethylaminobenzenediazonium tetrachlorozincate
p-morpholinobenzenediazonium tetrachlorozincate
p-morpholinobenzenediazonium tetrafluoroborate
2,5-diethoxy-4-(p-tolylthio)benzenediazonium tetrachlorozincate
4-ethylamino-o-toluenediazonium tetrachlorozincate
4-diethylamino-o-toluenediazonium tetrachlorozincate
2-methoxy-4-morpholinobenzenediazonium trichlorozincate
4-[ethyl(2-hydroxyethyl)amino]-o-toluenediazonium tetrachlorozincate
p-[benzyl(ethyl)amino]benzenediazonium tetrachlorozincate
2,5-diethoxy-4-morpholinobenzenediazonium tetrachlorozincate
2,5-dibutoxy-4-morpholinobenzenediazonium tetrachlorozincate
2,5-dibutoxy-4-morpholinobenzenediazonium hydrogen sulfate
p-[2-hydroxyethyl(methyl)amino]benzenediazonium tetrachlorozincate
2,5-diethoxy-4-(4-methyl-1-piperazinyl)benzenediazonium hydrogen tetrachlorozincate
4-(1-pyrrolidinyl)-m-toluenediazonium tetrachlorozincate
p-[ethyl(2-hydroxyethyl)amino]benzenediazonium tetrachlorozincate
p-dimethylaminobenzenediazonium tetrachlorocadmate
p-diethylaminobenzenediazonium chloride
p-[ethyl(2-hydroxyethyl)amino]benzenediazonium chloride
p-[(2-hydroxyethyl)methylamino]benzenediazonium chloride
p-ethylaminobenzenediazonium chloride
4-diethylamino-o-toluenediazonium chloride
p-[benzyl(ethyl)amino]benzenediazonium tetrachlorozincate
3-chloro-4-diethylaminobenzenediazonium chloride
2,5-diethoxy-4-morpholinobenzenediazonium chloride
2,5-diethoxy-4-(p-tolylthio)benzenediazonium chloride
4-(p-chlorophenoxy)-2,5-diethoxybenzenediazonium chloride
2,4′,5-triethoxybiphenyldiazonium chloride
p-diethylaminobenzenediazonium tetrafluoroborate
4-(1-pyrrolidinyl)-m-toluenediazonium chloride
p-(1-pyrrolidinyl)benzenediazonium chloride
p-piperidinobenzenediazonium chloride
p-(1-perhydroazocinyl)benzenediazonium tetrafluoroborate
p-(4-methyl-1-piperazinyl)benzenediazonium hydrogen tetrachlorozincate
p-[4-(2-hydroxyethyl)-1-piperazinyl]benzenediazonium chloride
4-(3-azabicyclo[3.3.3]non-3-yl)-2,5-diethoxybenzenediazonium chloride
4-(4-acetyl-1-piperazinyl)-2,5-dipentyloxybenzenediazonium hydrogen sulfate
p-(2,6-dimethylmorpholino)benzenediazonium chloride.

The diazo compounds of the instant invention may be employed in connection with formulations for use in coating the films, plastic layers or other suitable carriers. It has been found that the novel diazo compounds of the instant invention exhibit an extremely high degree of resistance to blushing and background discoloration which characteristic makes these formulations far superior to those known in the prior art.

Materials coated with the novel compositions of the present invention are also stable even under conditions of high temperature and high humidtiy. The conditions known as blushing is a result of poor compatibility of the diazo salt with the plastic layer substrate which results in a haze on the plastic layer which impairs its transparency and appearance.

The novel antimony and arsenate complexes of the instant invention minimize this blushing effect because of the lower water solubility of these diazo compounds. It is also noted that the novel compounds of the instant invention are extremely soluble in organic solvents such as ketones, alcohols and the like which are commonly used for applying diazo formulations to film bases.

The present invention will now be described by reference to the following specific examples. Such examples are presented for purposes of illustration only, and the present invention is in no way to be deemed as limited thereto.

EXAMPLE I

An aqueous solution of 4-(1-pyrrolidinyl)-m-toluenediazonium tetrachlorozincate was treated with a slight excess of hexafluoroarsenic acid, 65%. Essentially all the diazonium salt precipitated as the yellow hexafluoroarsenate. A single recrystallization from methanol gave a product, M. 129.5–130° C., (dec.), which analyzed N 11.22%, 11.16%; calculated for $C_{11}H_{14}AsF_6N_3$, 11.14%.

This diazonium salt was coated on 5 mil cellulose diacetate film from the following solution:

Acetone: 37 ml.
Cellulose acetate: 0.4 g.
Methanol: 46 ml.
Formic acid: 7 ml.
5-sulfosalicylic acid: 2.0 g.
m,m'-Ethylenedioxydiphenol: 2.5 g.
Acetoacetanilide: 0.35 g.
3-hydroxy-2-naphth-o-toluidide: 1.25 g.
4-(1-pyrrolidinyl) - m - toluenediazonium hexafluoroarsenate: 2.0 g.

Printing under a transparent master bearing a positive image and development with ammonia were conventional.

EXAMPLE II

An aqueous solution of 4-(1-pyrrolidinyl)-m-toluenediazonium tetrachlorozincate was treated with a slight excess of hexafluoroantimonic acid, 65%. Essentially all the diazonium salt precipitated as the hexafluoroantimonate. A single recrystallization from methanol resulted in a product which had a melting point of 122–122.5° C. (dec.), and analyzed N, 9.87%, 9.83% calculated for $C_{11}H_{14}F_6N_3Sb$, 9.91%. The coating, printing and development of this novel hexafluoroantimonate were carried out in the example described for the hexafluoroarsenate in Example I.

EXAMPLE III

For purposes of comparison with the coated films of Examples I and II, similar coated films were prepared by the procedure of Example I which differed only to the extent that the diazonium hexafluoroarsenate and hexafluoroantimonate were replaced by 2.25 grams of 4-(1-pyrrolidinyl)-m-toluenediazonium tetrachlorozincate and alternatively by 1.6 grams of 4-(1-pyrrolidinyl)-m-toluenediazonium hexafluorophosphate, using the solution of Example I. These mixtures were then coated on similar cellulose diacetate film. The four film samples then printed at the same speed and were found to be very similar in both dye shade and dye density. It is noted, however, that only the films coated with the compositions of Examples I and II and coated with the hexafluorophosphate diazonium compound were comparable in their resistance to precoupling and were much more stable than the coated film which was coated with the tetrachlorozincate diazonium compound. Furthermore, the printed and developed films which employed the compositions of Examples I and II held up in a far superior manner under conditions of 120° F. and 90% relative humidity than did the samples coated with the tetrachlorozincate and the hexafluorophosphate diazonium compounds, which showed discoloration in the background areas.

EXAMPLE IV 220 g. of 2,5-dibutoxy-4-morpholinobenzenediazonium tetrachlorozincate was added with stirring to a solution comprising 2000 mls. of 2-propanol and 2000 mls. of water at 45° C. The solution was filtered and treated with 100 ml. hexafluoroarsenic acid 65% and chilled. The resultant crystalline product was collected after several days, washed, and dried in vacuum. The resultant yield was 238.8 g. (91.4%) of 2,5-dibutoxy-4-morpholinobenzenediazonium hexafluoroarsenate, which had a melting point of about 108–110° C. (dec.). Analysis: N, 7.75%, 7.80% calculated for $C_{18}H_{28}AsF_6N_3O_3$: 8.03%. This diazonium salt was then coated from the following solution onto a polyethylene terephthalate base which had been previously coated with a lacquer:

Acetone: 35 ml.
Methanol: 50 ml.
5-sulfosalicylic acid: 1.8 g.
m,m'-Ethylenedioxydiphenol: 4.8 g.
Resorcinol: .15 g.
3-hydroxy-2-naphth-o-toluidide: .90 g.
Tint solution: 2 ml.
2,5-dibutoxy-4-morpholinobenzenediazonium hexafluoroarsenate: 2.1 g.
p-Diethylaminobenzenediazonium chlorozincate: 1.2 g.

Prints were made with this coated base from a positive original and developed with ammonia. The resultant product had a significantly cleaner background than prints made with a base coated with a similar solution, differing only in the substitution of the corresponding tetrachlorozincate and tetrafluoroborate salts for the above hexafluoroarsenate salt.

EXAMPLE V 2,5 - dibutoxy - 4 - morpholinobenzenediazonium hexafluoroantimonate was prepared in a manner similar to that of Example IV except that hexafluoroantimonic acid was substituted for the hexafluoroarsenic acid employed therein. The recrystallized salt melted slowly over the range of from 86–97° and analyzed N 7.42, 7.34%; calculated for $C_{18}H_{28}F_6N_3O_3Sb$, 7.37%. The antimonate salt was coated onto a polyethylene terephthalate base, which had been previously coated with a clear lacquer, from the solution of Example IV with the only exception that the antimonate salt was substituted for the arsenate salt. When coated and developed in a manner similar to Example IV, the antimonate salt provided a product which was significantly cleaner in background than that base material coated with similar solutions containing 2,5-dibutoxy - 4 - morpholinobenzenediazonium tetrachlorozincate and tetrafluoroborate respectively, in place of the hexafluoroantimonate.

EXAMPLE VI

4 - anilino - 2 - methoxybenzenediazonium hexafluoroarsenate was prepared by reacting 4 - anilino - 2 - methoxybenzenediazonium chloride with hexafluoroarsenic acid in water. The resultant product gave a 90% yield which melted at 167° (dec.) and assayed over 95%. When the product was recrystallized from methanol it melted at 171.5° (dec.); analysis 9.69%, 9.76% N; calculated 10.12% N. The product had a maximum molar absorptivity at 365 mµ of 31,900 in methanol. Film bases of cellulose triacetate and cellulose diacetate film were coated with the following solution:

2-butanone: 50 ml.
Methanol: 50 ml.
5-sulfosalicylic acid: 1.75 g.
3-hydroxy-2-naphth-o-toluidide: 0.6 g.
N-benzylacetoacetamide: 0.4 g.
Methyl Violet B (4 g.) in 1000 ml. of 2-methoxyethanol: 1 ml.
4-anilino-2-methoxybenzenediazonium hexafluoroarsenate: 2.0 g.

The diazonium salt was found to be very soluble in the above formulation and the coated and dried product which employed cellulose diacetate or cellulose triacetate was found to be free from haze or blush. Printing under a positive master and subsequent development with ammonia gave a green replica of the master, which replica was suitable for projection viewing.

EXAMPLE VII p-Morpholinobenzenediazonium hexafluoroarsenate was prepared from the corresponding diazonium tetrachlorozincate which was reacted with hexafluoroarsenic acid (65%) in water. The resultant product, after recrystallization from methanol, had a melting point of 159° C. (dec.), and analyzed to have a nitrogen content of 11.1%, 11.03% (calculated 11.08%). This diazonium compound was then coated onto a cellulose triacetate base with a coating formulation having the following formula.

2-butanone: 30 ml.
2-methoxyethanol: 10 ml.
Methanol: 5 ml.
5-sulfosalicylic acid: 1.0 g.
3-hydroxy-2-naphth-o-toluidide: 0.75 g.
p-Morpholinobenzenediazonium hexafluoroarsenate: 1.50 g.

The coated, dried, exposed and ammonia-developed film resulted in an excellent purple replica of the master, which replica was considered to have excellent quality for projection viewing.

EXAMPLE VIII

4 - diethylamino - 2 - trifluoromethylbenzenediazonium hexafluoroarsenate was prepared by reacting 4-diethylamino - 2 - trifluoromethylbenzenediazonium chloride with hexafluoroarsenic acid. Yield 99%; Properties after recrystallization from methanol M. 116–117° (dec.); N found 9.46%, 9.61%, N calculated 9.7%; molar absorptivity at 385 m$\mu$ was 36,000.

A transparent cellulose triacetate film base was coated with the following solution:

2-butanone: 70 ml.
Cellulose acetate: 0.4 g.
2-methoxyethanol: 30 ml.
5-sulfosalicylic acid: 1.3 g.
Stannic chloride: 0.3 g.
3-hydroxy-2-naphth-o-toluidide: 1.6 g.
4-diethylamino-2-trifluoromethyl-benzenediazonium hexafluoroarsenate: 3.0 g.

The coated film was dried, exposed to UV light under a transparent original, and developed with ammonia. The resultant film had a high density purple copy. The development rate of the film was found to be far superior to that of a control film which had been coated with a similar composition which employed p-diethylaminobenzenediazonium chlorozincate as a sensitizer. Test film coated with 4 - diethylamino - 2 - trifluoromethylbenzenediazonium hexafluoroarsenate was found to have a package stability far superior to a film coated with a similar composition in which 4-diethylamino-2-trifluoromethylbenzenediazonium hexachlorostannate was employed as a sensitizer.

EXAMPLE IX

4-[ethyl(2 - hydroxyethyl)amino] - 2-trifluoromethylbenzenediazonium hexafluoroarsenate was prepared by reacting 5-chloro-2-nitrobenzotrifluoride with 2-ethylaminoethanol in dimethyl sulfoxide so as to obtain N-ethyl-2-(4-nitro-3 - trifluoromethylanilino)ethanol. This compound was then reduced catalytically so as to obtain N-ethyl-2-(4-amino - 3 - trifluoromethylanilino)ethanol which was subsequently diazotized in a conventional manner in a hydrochloric acid solution. To the solution of this diazotized compound there was then added an excess of hexafluoroarsenic acid. An oil separated, which oil solidified slowly. When recrystallized from ethanol, the product had the following properties: a melting point of from 85–87° (slow dec.); analyzed N, 9.49, 9.48%; calculated 9.36%. Molar absorptivity at 388 m$\mu$ was 37,400.

The 4-[ethyl(2 - hydroxyethyl)amino] - 2-trifluoromethylbenzenediazonium hexafluoroarsenate was then coated onto a transparent cellulose triacetate film base with a coating composition having the following formulation:

2-butanone: 50 ml.
Cellulose acetate: 0.5 g.
2-methoxyethanol: 50 ml.
5-sulfosalicylic acid: 2.0 g.
Stannic chloride: 0.2 g.
Thiourea: 2.0 g.
3-hydroxy-2-naphth-o-toluidide: 1.5 g.
4-[ethyl(2-hydroxyethyl)amino] - 2-trifluoromethylbenzenediazonium hexafluoroarsenate: 4.0 g.

The coated film was subsequently dried, exposed and developed in ammonia. When this test film was compared with a control film which employed a similar coating composition with the exception that 4-[ethyl(2-hydroxyethyl)amino]-o-toluenediazonium chlorozincate was employed as the sensitizer, this test film showed a far greater visual density and improved development rate than the control.

EXAMPLE X p-Diethylaminobenzenediazonium hexafluoroarsenate was made by metathese from the corresponding chlorozincate in water and hexafluoroarsenic acid in 95% yield. It was a yellow solid, M.P. 119° (dec.), analyzing 11.35%, 11.29% N; calculated for $C_{10}H_{14}AsF_6N_3$, 11.58% N.

This salt was coated on a poly(ethyleneterephthalate) base, previously lacquered, from the following solution.

Acetone: 35 ml.
Methanol: 50 ml.
5-sulfosalicylic acid: 1.8 g.
m,m-Ethylenedioxydiphenol: 4.8 g.
Resorcinol: 0.15 g.
3-hydroxy-2-naphth-o-toluidide: 0.90 g.
Tint solution: 2.0 ml.
2,5-dibutoxy-4-morpholinobenzenediazonium hexafluoroarsenate: 3.0 g.
p-Diethylaminobenzenediazonium hexafluoroarsenate: 1.7 g.

Prints made from this sensitized material and a positive original were even cleaner in background than those made in Example IV.

It is, of course, understood that the coating compositions employed in connection with the novel antimonate and arsenate diazonium compounds of the instant invention may be employed with solvents such as methanol, ethanol, propanol, acetone, butanone, propanone, etc. Furthermore, conventional ingredients in such coating compositions include coupling inhibitors such as tartaric and citric acids, stabilizers, such as zinc chloride, background inhibitors including thiourea, couplers such as resorcinol, 3,5-dihydroxybenzoic acid, and 3,5-dihydroxy-N-(2-hydroxyethyl)-benzamide, in addition to the novel diazonium compounds disclosed herein.

What is claimed is:

1. A light-sensitive diazonium salt having the formula $ArN_2ZF_6$ wherein $ArN_2$ represents either N-substituted 4-aminobenzene diazonium moieties of N-substituted 4-amino-substituted benzene diazonium moieties wherein said N-substituted amino is selected from the group consisting of (1) dialkylamino group, (2) alkylamino group wherein the two alkyl groups present are different, (3) phenylamino group, and (4) heterocyclic group selected from the group consisting of morpholino, piperazinyl, pyrrolidinyl, 1-perhydroazocinyl, and 3-azabicyclo [3.3.3]non-3-yl, and wherein said benzene ring is substituted by the group selected from the group consisting of alkyl, alkoxy, trifluoromethyl groups or halogen atom, and Z is an arsenic atom.

2. A two component diazotype light-sensitive material comprising a base support having disposed thereon a coating comprising a diazonium salt which is sensitive to ultra-violet light having the formula $ArN_2ZF_6$ wherein $ArN_2$ represents either N-substituted 4-amino-benzene diazonium moieties or N-substituted 4-amino-substituted benzene diazonium moieties wherein said N-substituted amino is selected from the group consisting of (1) dialkylamino group, (2) alkylamino group wherein the two alkyl groups present are different, (3) phenylamino group, and (4) heterocyclic group selected from the group consisting of morpholino, piperazinyl, pyrrolidinyl, 1-perhydroazocinyl, and 3-azabicyclo[3.3.3]non-3-yl, and wherein said benzene ring is substituted by the group selected from the group consisting of alkyl, alkoxy, trifluoromethyl groups or halogen atom, and Z is an arsenic atom, an azo coupling compound and an acidic stabilizer.

3. The compound of claim 1 wherein said compound is 4-(1-pyrrolidinyl)-m-toluene diazonium hexafluoroarsenate.

4. The compound of claim 1 wherein said compound is 2,5-dibutoxy-4 - morpholinobenzenediazonium hexafluoroarsenate.

5. The compound of claim 1 wherein said compound is p-diethylaminobenzenediazonium hexafluoroarsenate.

6. The compound of claim 1 wherein said compound is 4-anilino-2 - methoxybenzenediazonium hexafluoroarsenate.

7. The compound of claim 1 wherein said compound is p-morpholinobenzenediazonium hexafluoroarsenate.

8. The compound of claim 1 wherein said compound is 4-diethylamino - 2 - trifluoroethylbenzenediazonium hexafluoroarsenate.

9. The compound of claim 1 wherein said compound is 4-[ethyl(2-hydroxyethyl)amino]-2 - trifluoromethylbenzenediazonium hexafluoroarsenate.

References Cited

UNITED STATES PATENTS

| | | | |
|---|---|---|---|
| 1,825,729 | 10/1931 | Hentrich et al. | 260—142 |
| 3,155,513 | 11/1964 | Sorensen | 96—41 |
| 3,203,803 | 8/1965 | Habib et al. | 96—91 |
| 3,211,553 | 10/1965 | Ito | 96—91 X |
| 3,260,599 | 7/1966 | Lokken | 96—91 X |
| 3,294,533 | 12/1966 | Sus et al. | 96—33 |
| 3,342,601 | 9/1967 | Houle et al. | 96—75 |
| 3,373,021 | 3/1968 | Adams et al. | 96—91 X |
| 3,524,866 | 8/1970 | Klootwijk | 260—141 X |

OTHER REFERENCES

Dinaburg, M., "Photosensitive Diazo Cpds," 1964, pp. 87, 89 and 90. Chem. Abstracts, vol. 62, 15741d, 1965.

CHARLES L. BOWERS, JR., Primary Examiner

U.S. Cl. X.R.

96—49; 260—141, 142